(12) United States Patent
Flowerday et al.

(10) Patent No.: US 10,200,413 B1
(45) Date of Patent: *Feb. 5, 2019

(54) SELECTIVE REGULATION OF INFORMATION TRANSMISSION FROM MOBILE APPLICATIONS TO THIRD-PARTY PRIVACY COMPLIANT TARGET SYSTEMS

(71) Applicant: Quantcast Corporation, San Francisco, CA (US)

(72) Inventors: Crispin Edward Harold Flowerday, San Francisco, CA (US); Michael F. Kamprath, Mountain View, CA (US); Faraaz Aejaz Sareshwala, Pleasanton, CA (US); Daniel Vogel Fernandez de Castro, Mexico City (MX)

(73) Assignee: Quantcast Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/959,267

(22) Filed: Apr. 22, 2018

Related U.S. Application Data

(63) Continuation of application No. 15/392,891, filed on Dec. 28, 2016, now Pat. No. 9,979,752, which is a (Continued)

(51) Int. Cl.
*G06F 21/00* (2013.01)
*G06F 21/62* (2013.01)
*H04L 29/06* (2006.01)

(52) U.S. Cl.
CPC .......... *H04L 63/20* (2013.01); *H04L 63/0407* (2013.01)

(58) Field of Classification Search
CPC ..... H04L 63/20; H04L 63/0407; H04L 63/10; H04W 12/02; G06F 21/62; G06F 21/6272; G06F 21/00
(Continued)

(56) References Cited

U.S. PATENT DOCUMENTS 6,134,593 A * 10/2000 Alexander .............. G06F 21/10
705/26.1
8,467,987 B1 6/2013 Davidson et al.
(Continued)

OTHER PUBLICATIONS

David Crowe et al., Google Privacy: Something or Nothing?, pp. 27-32, Information Security Curriculum Development Conference, Acm (Year: 2013).*

(Continued)

*Primary Examiner* — Shanto Abedin
(74) *Attorney, Agent, or Firm* — Robin W. Reasoner

(57) ABSTRACT

Selective regulation of information transmission from mobile applications to a third-party privacy compliant target system. A privacy policy is configured for and mapped to each of a multiplicity of mobile application concerns, with each privacy policy comprising rules regulating the transmission of information to a third-party privacy compliant target system. Instrumentation instructions can be integrated with a mobile application and provided to a mobile device. The instrumentation instructions direct the mobile application to submit a privacy policy request comprising a mobile application identifier from the mobile device to a third-party privacy compliance system and enable sending information from the mobile device to the third-party privacy compliant target system, subject to the privacy policy. The privacy policy request is received at the third-party privacy compliance system which selects the privacy policy based on an application identifier and sends the privacy policy to the mobile device for implementation.

20 Claims, 6 Drawing Sheets

Related U.S. Application Data continuation of application No. 15/269,291, filed on Sep. 19, 2016, now Pat. No. 9,603,011, which is a continuation of application No. 15/019,168, filed on Feb. 9, 2016, now Pat. No. 9,479,929, which is a continuation of application No. 13/900,471, filed on May 22, 2013, now Pat. No. 9,294,912.

(58) Field of Classification Search
USPC .............................................. 726/1–2, 26–27
See application file for complete search history.

(56) References Cited

U.S. PATENT DOCUMENTS

| | | | |
|---|---|---|---|
| 8,621,649 | B1 | 12/2013 | Van Dijk et al. |
| 8,627,506 | B2 | 1/2014 | Vera et al. |
| 8,973,090 | B1 | 3/2015 | Banerjee |
| 9,110,976 | B2 | 8/2015 | Bolgert et al. |
| 2006/0224742 | A1* | 10/2006 | Shahbazi .............. H04L 63/105 709/226 |
| 2007/0006289 | A1 | 4/2007 | Limont et al. |
| 2007/0156659 | A1 | 7/2007 | Lim |
| 2007/0266420 | A1 | 11/2007 | Hawkins et al. |
| 2009/0070412 | A1 | 3/2009 | Dangelo et al. |
| 2010/0115581 | A1* | 5/2010 | Goldschlag ......... H04L 41/0806 726/1 |
| 2010/0191604 | A1 | 7/2010 | Raleigh |
| 2011/0191664 | A1 | 8/2011 | Sheleheda et al. |
| 2012/0084185 | A1* | 4/2012 | Ciaramitaro ......... G06Q 40/123 705/31 |
| 2012/0084186 | A1 | 4/2012 | Brown et al. |
| 2012/0290545 | A1 | 11/2012 | Tumanov et al. |
| 2012/0331567 | A1* | 12/2012 | Shelton ............... G06F 21/6245 726/28 |
| 2013/0081101 | A1 | 3/2013 | Baer et al. |
| 2013/0111547 | A1 | 5/2013 | Kraemer |
| 2013/0212638 | A1* | 8/2013 | Wilson .................... H04L 63/20 726/1 |
| 2013/0268668 | A1 | 10/2013 | Abuelsaad et al. |
| 2013/0298185 | A1 | 11/2013 | Koneru et al. |
| 2014/0007222 | A1* | 1/2014 | Qureshi .................. G06F 21/10 726/16 |
| 2014/0053229 | A1 | 2/2014 | Saib |
| 2014/0090091 | A1 | 3/2014 | Prakash et al. |
| 2014/0259094 | A1 | 9/2014 | Narayanaswamy et al. |

OTHER PUBLICATIONS

Hsueh, Pei-Yun Hsueh, et al, Privacy Protection for Personal Data Integration and Sharing in Care Coordination Services, IEEE, 2012.
Shilton, Katie et al, Participatory Privacy in Urban Sensing, eScholarship University of California, 2008.

\* cited by examiner

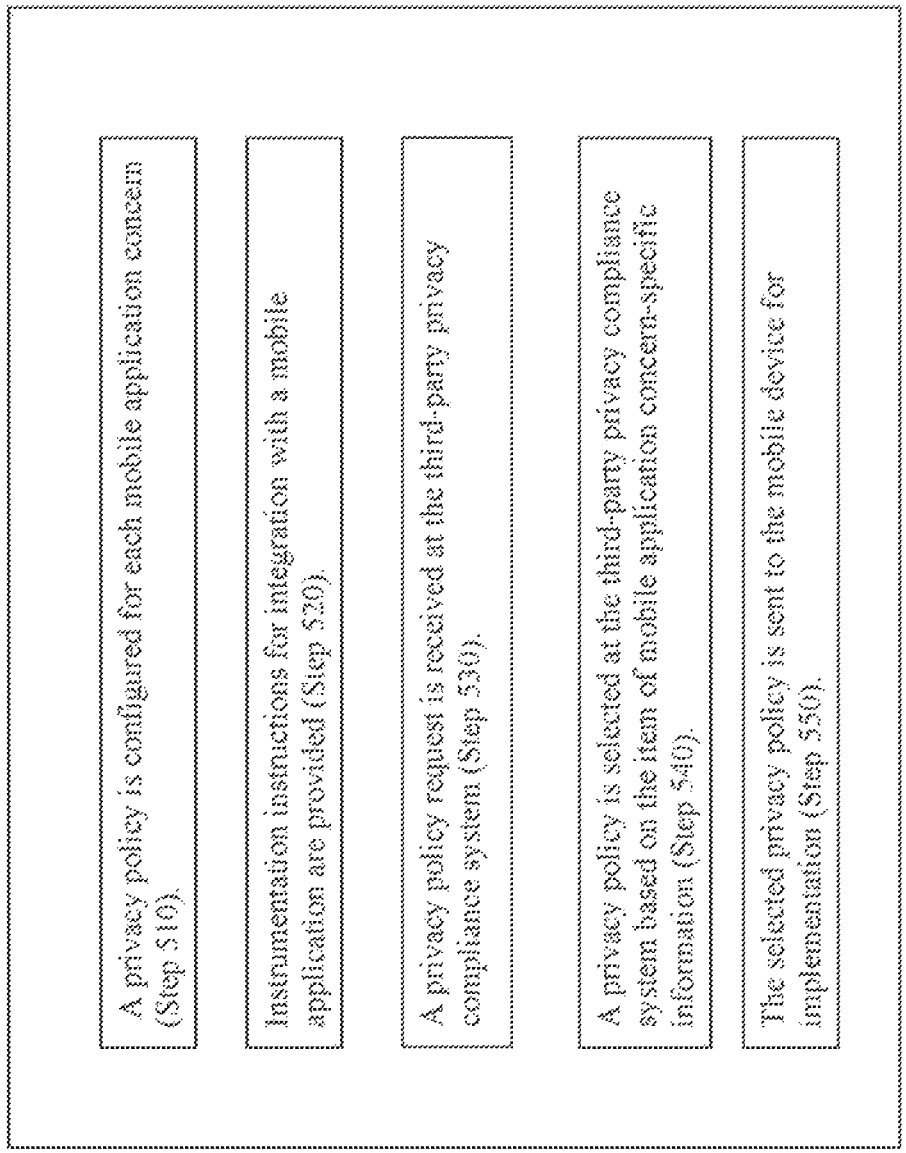

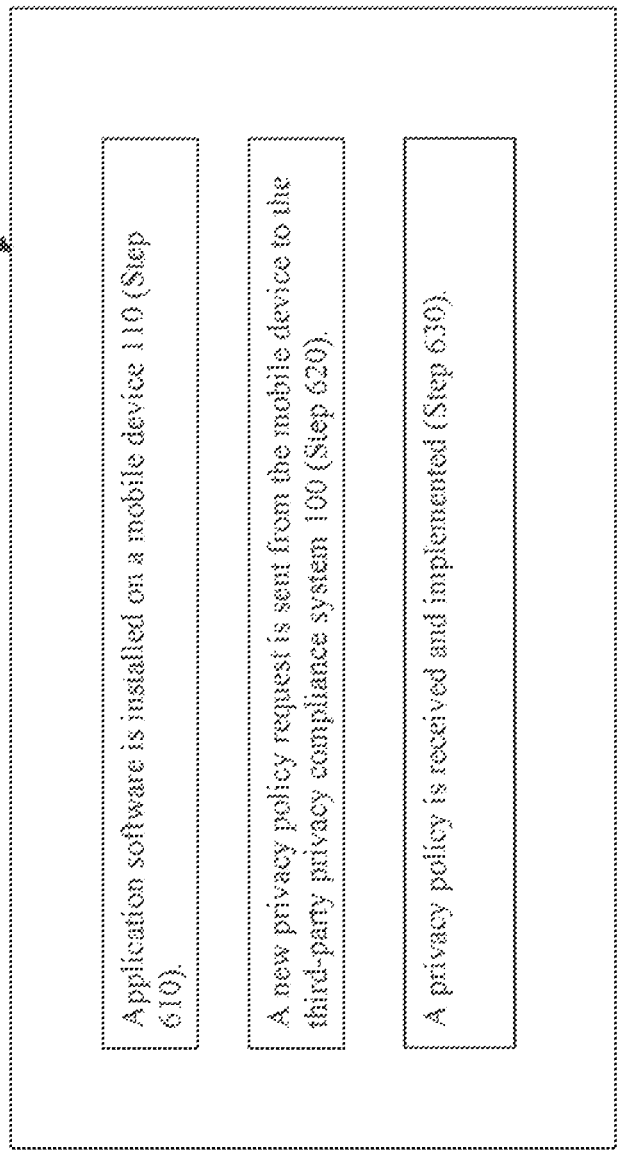

SELECTIVE REGULATION OF INFORMATION TRANSMISSION FROM MOBILE APPLICATIONS TO THIRD-PARTY PRIVACY COMPLIANT TARGET SYSTEMS

CROSS-REFERENCE TO RELATED APPLICATIONS

This application is a continuation of U.S. Non-Provisional application Ser. No. 15/392,891 entitled "Selective Regulation of Information Transmission from Mobile Applications to Third-Party Privacy Compliant Target Systems" by Crispin Edward Harold Flowerday, Michael F. Kamprath, Faraaz Aejaz Sareshwala, and Daniel Vogel Fernandez de Castro, filed on Dec. 28, 2016, which is a continuation of U.S. Non-Provisional application Ser. No. 15/269,291 entitled "Selective Regulation of Information Transmission from Mobile Applications to Third-Party Privacy Compliant Target Systems" by Crispin Edward Harold Flowerday, Michael F. Kamprath, Faraaz Aejaz Sareshwala, and Daniel Vogel Fernandez de Castro, filed on Sep. 19, 2016, now U.S. Pat. No. 9,603,011 issued on Mar. 21, 2017, which is a continuation of U.S. Non-Provisional application Ser. No. 15/019,168 entitled "Selective Regulation of Information Transmission from Mobile Applications to Third-Party Privacy Compliant Target Systems" by Crispin Edward Harold Flowerday, Michael F. Kamprath, Faraaz Aejaz Sareshwala, and Daniel Vogel Fernandez de Castro, filed on Feb. 9, 2016, now U.S. Pat. No. 9,479,929 issued on Oct. 25, 2016, which is a continuation of U.S. Non-Provisional application Ser. No. 13/900,471 entitled "Selective Regulation of Information Transmission from Mobile Applications to Third-Party Privacy Compliant Target Systems" by Crispin Edward Harold Flowerday, Michael F. Kamprath, Faraaz Aejaz Sareshwala, and Daniel Vogel Fernandez de Castro, filed on May 22, 2013, now U.S. Pat. No. 9,294,912 issued on Mar. 22, 2016, all of which are hereby incorporated by reference in their entirety.

BACKGROUND

Field of Invention

The invention pertains in general to methods of protecting the privacy of mobile device users.

Description of Related Art

Mobile application concerns, such as the vendors of applications which run on cell phones, are eager to understand the way consumers interact with their applications. For example, a cell phone application vendor may instrument their applications so that information can be transmitted from the cell phone to the cell phone application vendor's systems when the cell phone application is active. In some cases, a cell phone application vendor may instrument their applications so that information can be transmitted from the cell phone to third-party measurement system which can collect information on behalf of a cell phone application vendor and provide insights and reporting based on the collected information. However, consumers are rightfully concerned about privacy issues related to the types of information which may be collected and where that information may be transmitted.

What is needed is a way to enable a mobile application concern to support the selective transmission of information to a third-party system, while ensuring consumer confidence and privacy.

SUMMARY

Embodiments of the invention provide a method, a non-transitory computer-readable storage medium and a system for selectively regulating transmission of information from mobile devices via instrumented mobile applications to a third-party privacy compliant target system. In an embodiment, a third-party privacy compliance system provides instrumentation instructions for mobile application integration. The instrumentation instructions may be in the form of a software developers kit (SDK) which can be integrated with mobile application and operate on the mobile device. The instrumentation instructions comprise instructions for submitting a privacy policy request from the mobile device to the third-party privacy compliance system. The privacy request includes an item of mobile application concern-specific information, such as a vendor identifier, which is unique to a mobile application vendor. Another example of an item of mobile application concern-specific information is an application label, which is specific to an application vendor's application or suite of applications. The item of mobile application concern-specific information is not unique to a mobile device, an individual instance of an installed mobile application or a mobile device operator; rather, the mobile application concern-specific information is common to a community such as the mobile application concern's mobile application installed base. The instrumentation instructions further comprise instructions for implementing a received privacy policy. A privacy policy is configured at the third-party privacy compliance system for each mobile application concern, with each privacy policy comprising one or more rules for regulating the transmission of restricted information to a third-party privacy compliant target system such as the third-party privacy compliance system, one or more third-party privacy compliant partners or combinations thereof. For example, a rule may prohibit the transmission of geolocation information describing the exact location of the mobile device from the mobile device to a third-party privacy compliant target system. Responsive to receiving a privacy policy request from a mobile device, the third-party privacy compliance system selects a privacy policy based on the vendor-specific information and sends the selected privacy policy to the mobile device for implementation. Advantageously, this enables each vendor to independently establish and implement a consistent set of rules governing the transmission of information from their installed applications to a third-party privacy compliant target system. Furthermore, because the privacy policies are selected based on vendor-specific information, privacy policies may be implemented without requiring the registration or unique identification of the mobile device, individual instance of an installed mobile application, or mobile device operator to the third-party privacy compliance system.

In an embodiment, at least some portion of the implementation instructions are triggered by the initiation of a new use session such as the launch of the mobile application, the end of a use-session or the expiration of a session token. In some examples, a fresh privacy policy is requested by the mobile device each time a portion of the implementation instructions are executed or according to a schedule.

In an embodiment, a restrictive default privacy policy can be implemented at the mobile device until a valid and current privacy policy is received from the third-party privacy compliance system. Advantageously, this can prevent the accidental transmission of restricted information via the implementation instructions during the time period between the initiation of a new use session and the implementation of a current privacy policy.

In an embodiment, a mobile device operator may configure one or more local rules which can be maintained at the mobile device and may not be transmitted to the third-party privacy compliance system. A local rule can apply additional restrictions to the default privacy policy, a received privacy policy or both.

In an embodiment, a mobile device operator may configure one or more rules which can be transmitted to the third-party privacy compliance system with each privacy policy request. This enables the customization of a privacy policy by a mobile device operator without requiring the third-party privacy compliance system to maintain a unique identifier or registration for each mobile device, individual instance of an installed mobile application or mobile device operator.

In an embodiment, the instrumentation instructions may comprise instructions for prohibiting the transmission of information to one or more third-party privacy compliant target systems via the instrumentation instructions in the event that the mobile device operator disables advertising tracking. The instrumentation instructions may further comprise instructions for prohibiting the transmission of information to the third-party privacy compliance system in the event that the mobile device operator disables advertising tracking. In some cases, the instrumentation instructions may further initiate the generation of a new application installation identifier, for every mobile application on the mobile device which is integrated with the instrumentation instructions.

BRIEF DESCRIPTION OF DRAWINGS

Figure (FIG. 1 illustrates an example computing environment in accordance with an embodiment;

FIG. 5 is a flow chart illustrating an example of a method for selectively regulating transmission of information from a mobile device to a third-party privacy compliant target system, according to an embodiment.

FIG. 6 is a flow chart illustrating an example of a method for selectively regulating transmission of information from a mobile device to a third-party privacy compliant target system, according to an embodiment.

DETAILED DESCRIPTION OF THE INVENTION

Figure 1:
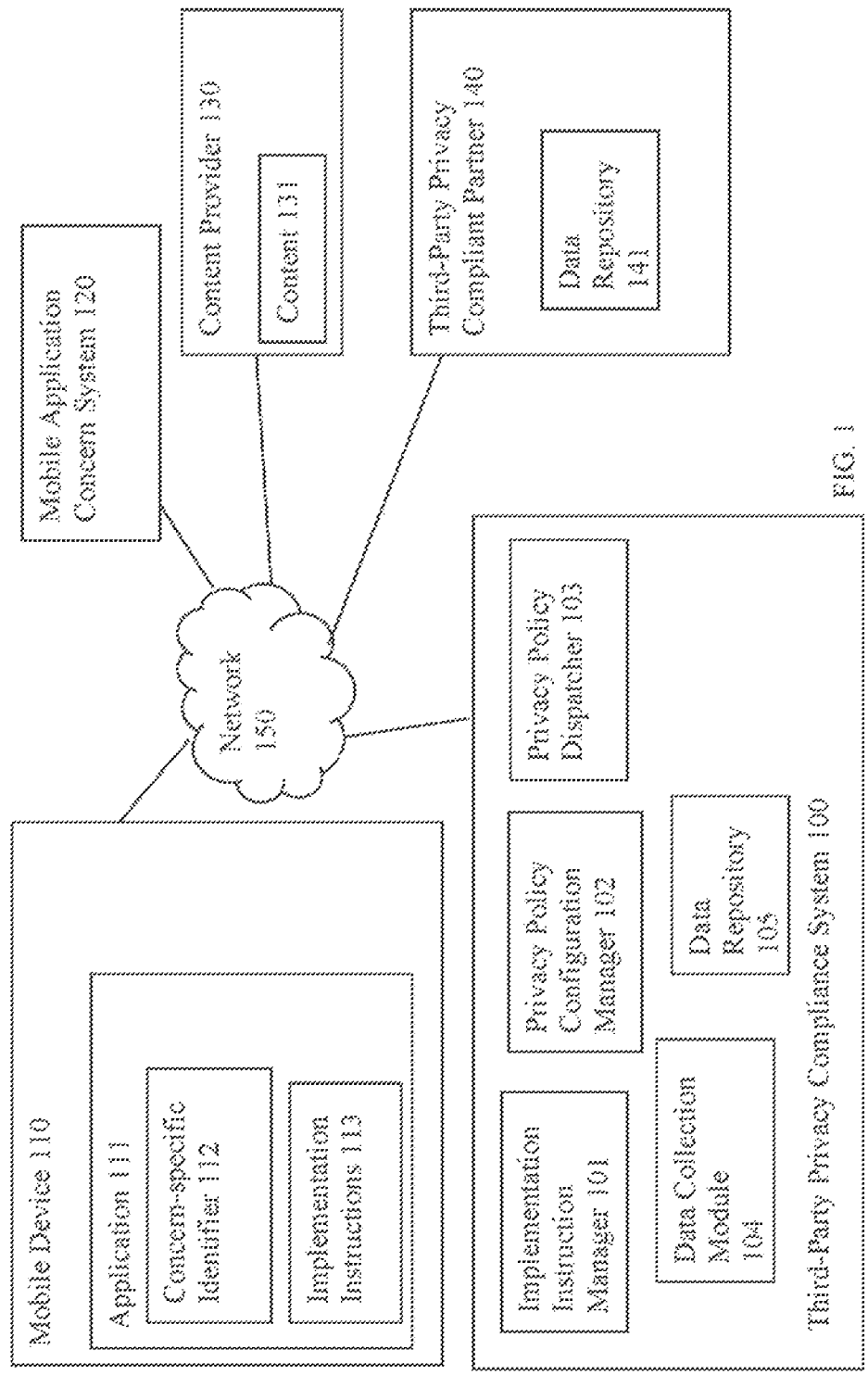

FIG. 1 illustrates an example computing environment in accordance with an embodiment. In particular, third-party privacy compliance system 100 can be used to help understand the way consumers interact with mobile applications installed on mobile devices, while preserving consumer confidence and privacy. Applications can be instrumented with instrumentation instructions for execution on mobile devices. Information sent from the mobile devices to a third-party privacy compliant target system, such as a third-party privacy compliance system, a third-party privacy compliant partner or both, via the instrumentation instructions are subject to a privacy policy. The privacy policy is selected at the third-party privacy compliance system based on vendor-specific information provided through the instrumentation instructions which are executed on the mobile device. Advantageously, selecting the privacy policy based on vendor-specific information at the third-party privacy compliance system enables each application vendor to independently, rapidly and effectively implement new or updated privacy policy rules in a manner that is consistent across a community of their mobile application users. Furthermore, there is no requirement that each individual instance of an installed mobile application, mobile device operator or mobile device be registered with the third-party privacy compliance system; there is no requirement for a unique identifier per mobile device operator, mobile device or individual instance of an installed mobile application in order to select or implement a privacy policy.

As shown in FIG. 1, the computing environment includes a third-party privacy compliance system 100, a mobile device 110, a mobile application concern system 120, a content provider 130 and a third-party privacy compliant partner 140. The third-party privacy compliance system 100, the mobile device 110, the mobile application concern system 120, the content provider 130 and the third-party privacy compliant partner 140 are connected by a communication network 150, such as a local area network, a wide area network, a wireless network, an intranet, a cable network, a satellite network, a cellular phone network, an optical network, the Internet or combinations thereof.

In various embodiments, mobile device 110 receives and transmits data over the communication network 150. Examples of a mobile device 110 include, but are not limited to, a smartphone, mobile computer, laptop, computing tablet, personal digital assistant (PDA), portable gaming device, e-reading device and a cell phone. Although only one mobile device 110 is shown in FIG. 1 for clarity, any number of mobile devices may be connected to the communication network 150.

One or more mobile applications 111 may be installed on and operate on a mobile device 110. Examples of mobile applications include, but are not limited to, internet browsers, games, information retrieval applications and general productivity applications. Some mobile applications can detect or receive information from the mobile device hardware, mobile device operating system, mobile device firmware, systems integrated with the mobile device, the mobile device operator or combinations thereof. For example, a mobile application may have access to a status, a hardware identifier, a software identifier, or combinations thereof, accessed through a mobile operating system or firmware. A mobile application may have access to geolocation information accessed through a GPS system integrated with or coupled to the mobile device. A mobile application may have access to personally identifiable information (PII) or private information entered by the mobile device operator such as a personal phone number directory. A mobile application may further have access to user identifiers, such as login identifiers, hashed user identifiers and assigned user identifiers.

Mobile device 110 can be associated with an identifier stored on the mobile device. For example, a hardware device identifier such as a Media Access Control Address (MAC address), International Mobile Station Equipment Identity (IMEI), Mobile Equipment Identifier (MEID) or Electronic Serial Number (ESN) can be stored on a device. A software identifier such as a cookie value, an application identifier or an operating system identifier such as an Apple iOS Advertising Identifier, an Android Device ID or Unique Device Identifier (UDID) can be stored locally on a mobile device.

A mobile application concern may be at least partially responsible for protecting the privacy of the consumers in the installed base of a mobile application 111. Examples of mobile application concerns include, but are not limited to, mobile software application vendors, mobile software application developers, mobile software application distributors and mobile device software-as-a-service (SAAS) providers. A mobile application concern may be eager to understand the way mobile device operators use their mobile applications while protecting the privacy of their user base; this may be especially true for mobile applications with access to personally identifiable information (PII).

An item of mobile application concern-specific information, such as a concern-specific identifier 112 can be established with respect to a mobile application concern. The item of mobile application concern-specific information is common to a community such as the mobile application concern's mobile application installed base, and is not unique to an individual instance of an installed mobile application, an individual mobile device operator or an individual mobile device. For example, a mobile application concern, such as a mobile application vendor, may map all of the application installation instances for all of their mobile software applications to a single concern-specific identifier 112, enabling consistent management of the privacy policies for their entire installed base. In another example, a mobile application concern may establish a concern-specific identifier 112 for each group of software applications; for example, a software concern may group their offerings by software application, software application suite, software application version, installation cohort or combinations thereof, with a unique concern-specific identifier 112 per group, enabling consistent management of the privacy policies for each group's installed base.

A concern-specific identifier may be provided to a mobile device by the mobile application concern. For example, a mobile application concern may generate the concern-specific identifier and share the concern-specific identifier with the third-party privacy compliance system. In another example, the third-party privacy compliance system may generate the concern-specific identifier and share it with the mobile application concern. The mobile application concern may distribute the concern-specific identifier with their application software. In an example, the concern-specific identifier may be distributed with the implementation instructions. In an example, the concern-specific identifier is embedded in the implementation instructions by the third-party privacy compliance system and subsequently distributed to the mobile devices when the implementation instructions are provided to the mobile devices.

Content provider 130 is a media channel which provides content 131 over the communications network 150 to a mobile device 110. Examples of content providers 130 can include web sites, mobile application shopping portals and streaming music service providers. In some cases, it can be useful to consider a content provider as comprising multiple content providers. For example, a content provider such as an online portal can provide multiple websites, such as localized versions of the same website. Examples of content 131 can include, but are not limited to, a webpage, an application installation package, a configuration file, a portion of an online video clip, a portion of a networked television program, a portion of a cable television program, a portion of a satellite television program, a portion of an Internet Protocol (IP) television program, a portion of an online audio clip, the results of a keyword search from an online search engine, the results of a request for directions from an online mapping service, advertising content, interfaces for making online purchases and interfaces for checking a bank account balance. In some examples, content 131 can be provided over the communications network 150, based on a request to content provider 130; in some examples, content provider 130 can push the content 131 over the communications network 150 to a mobile device 110. Although only one content provider 130 is shown in FIG. 1 for clarity, any number of content providers may be connected to the communications network 150.

In various embodiments, a mobile device 110 may access content 131 from content provider 130 over the communications network 150. In an example, a mobile device operator may operate an application 111, such as a mobile web browser, which is executed on mobile device 110, to access content 131 such as a webpage. In another example, a mobile device operator may operate an application 111, such as a music playing application, to access content 131 such as an audio file, which is provided by a content provider 130 such as an online music library system.

In an embodiment, the third-party privacy compliance system 100 includes an implementation instruction manager 101, a privacy policy configuration manager 102, a privacy policy dispatcher 103, a data collection module 104 and a data repository 105. Those of skill in the art will recognize that other embodiments of the third-party privacy compliance system 100 can include additional and/or different modules than the ones shown in FIG. 1. Moreover, the functionalities can be distributed among the modules in a different manner than described here.

In an embodiment, implementation instruction manager 101 provides implementation instructions for integration with a mobile application 111. Implementation instructions which are integrated with a mobile application are executed on the mobile device and may be invoked by the mobile application. In an example, the implementation instructions can be provided to a mobile application developer in the form of a software developers kit (SDK) which can be integrated with a mobile application and then distributed for installation and execution on a mobile device. In some cases, the mobile application developer will distribute the implementation instructions in conjunction with their mobile application for installation and execution on the mobile device.

The implementation instructions comprise instructions for requesting a privacy policy from a third-party privacy compliance system 100 and for implementing a privacy policy on the mobile device 110. The implementation instructions may include methods which may be called by the mobile application 111 such as methods which monitor, collect and/or process information in addition to a method for sending information to a third-party privacy compliant target system such as the third-party privacy compliance system 100, the third-party privacy compliant partner 140, or both, subject to a privacy policy. In an example, a privacy-conscious application concern can exclusively use the methods to send information to the third-party privacy compliance system 100, one or more systems such as a third-party privacy compliant partner 140 or combinations thereof.

In an example, the implementation instructions may comprise a script instead of or in addition to a SDK. For example, a script may be provided to a mobile device 110 by a mobile application concern 120, a third-party privacy compliant partner 140 or a third-party privacy compliance system 100. The script may be called by the mobile application to send information to a third-party privacy compliant target system, monitor information, collect information, process information or combinations thereof, subject to a privacy policy. A script, the concern-specific identifier or both may be provided in conjunction with or independently of the mobile application. In an example, a script, the concern-specific identifier or both may be stored on the mobile device 110 external to the mobile application 111.

The implementation instructions comprise instructions for requesting a privacy policy from the third-party privacy compliance system 100. The request for a privacy policy includes a concern-specific identifier 112. In an embodiment, the implementation instructions are implemented so that the privacy policy is requested at or near the beginning of each user-session, such as when a mobile application is first launched or first used after period of disuse; this can reduce the opportunity for information which does not comply with the privacy policy to be transmitted to the third-party privacy compliant target system. In some cases, a privacy policy can expire; for example, a privacy policy may include an expiration date or the implementation instructions may be configured to retire a privacy policy after an elapsed period of time. In an embodiment, the implementation instructions are implemented to check for privacy policy expiration and request a new privacy policy in the event that a privacy policy has expired.

In some embodiments, the implementation instructions may include a default privacy policy for use in the absence of a valid privacy policy at the mobile device such as when the most current privacy policy has expired, before a privacy policy has been received from the third-party privacy compliance system and/or in the event that the privacy policy is unavailable, has become corrupt or is unusable for any reason. It can be advantageous to configure a conservative, restrictive default privacy policy to reduce the opportunity for information which does not comply with the privacy policy to be transmitted to a third-party privacy compliant target system.

As previously discussed, a privacy policy is mapped to a concern-specific identifier at the third-party privacy compliance system 100. The instrumentation instructions residing on the mobile devices in an installed base can be configured to provide a common concern-specific identifier to the third-party privacy compliance system 100 in their respective requests for a privacy policy.

A privacy policy configuration manager 102 enables the configuration of a privacy policy. A privacy policy comprises one or more rules regulating the transmission of information to a third-party privacy compliant target system such as the third-party privacy compliance system 100, the third-party privacy compliant partner 140 or both. In an example, a rule can be used to characterize information which is permitted to be transmitted to the third-party privacy compliant target system. For example, a rule can comprise a white list which identifies the information which may be transmitted to the third-party privacy compliance system 100; similarly, a rule may enable the mobile device to identify information which may be transmitted to the third-party privacy compliance system 100. For example, a mobile application concern may establish a rule which explicitly permits the mobile application to send an Apple iOS Advertising Identifier to the third-party privacy compliance system 100 using a method enabled by the implementation instructions.

In an example, a rule can characterize information which is not permitted to be transmitted to a third-party privacy compliant system such as the third-party compliance system, the third-party privacy compliant partner or both. For example, a rule can comprise a black list which identifies the information which may not be transmitted to a third-party privacy compliant partner 140; similarly, a rule may enable the mobile device to identify information which may not be transmitted to the third-party privacy compliance system 100. For example, a mobile application concern may establish a rule which prevents the mobile application from sending a Unique Device Identifier (UDID) or specific items of personally-identifiable information (PII), to the third-party privacy compliance system 100 using a method enabled by the implementation instructions.

In an example, a rule can characterize information which must be pre-processed before it is permitted to be transmitted to a third-party privacy compliant target system. In an example a rule can comprise a list which identifies the information which must be pre-processed before transmission to the third-party privacy compliant partner 140; similarly, a rule may enable the mobile device to identify information which must be pre-processed before transmission to the third-party privacy compliant partner 140. For example, a rule may prohibit the transmission of any precise geolocation information to the third-party privacy compliant target system and enable the transmission of low-accuracy location description generated by pre-processing precise geolocation information.

In an example, a rule may comprise a key-value pair, with the key indicating the type of data that might be transmitted to a third-party privacy compliant target system and the value indicating the transmission limitations. For example, the limitations may be a simple Boolean "on" and "off", indicating that a particular type of data may or may not be transmitted to a third-party privacy compliant target system. In an example, the limitations may indicate a range of allowed values or disallowed values. In an example, the limitations may indicate transformation instructions which can be used by the instrumentation instructions to pre-process the data. An example of transformation instructions may map an exact value to a range of values, providing information with limited accuracy; another example of transformation instructions may comprise transforming or hashing a presumably unique value to another presumably unique value, such that the original unique value is not re-identifiable by the third-party privacy compliant target system.

One or more rules in a privacy policy can be configured on behalf of a mobile application concern to meet their business needs. In some cases, one or more rules in a privacy policy may be configured on behalf of the third-party privacy compliant target system to insure that minimum privacy standards are maintained by mobile application concerns which choose to direct information from their installed base to the third-party privacy compliant target system. In some cases, a graphical user interface may be provided to enable the configuration of rules and privacy policies. The rules and privacy policies are stored in the data repository 105, such as a database.

A privacy policy dispatcher 103 receives a request for a privacy policy and selects a privacy policy based on the request's concern-specific identifier. Because the privacy policy can be selected based on the request's concern-specific identifier, the third-party privacy compliance system 100 requires no prior knowledge of the source of the request in order to respond to the request. In other words, there is no pre-requirement for registration by a mobile application, a mobile device or a mobile device operator nor is there a requirement for a unique identifier related to a mobile application, a mobile device or a mobile device operator. Furthermore, the concern-specific identifier is applicable to the installed base configured by the mobile application concern, so the privacy policy can be selected based on a non-unique identifier for software applications which have an installed base of more than one installation.

In some embodiments, a privacy policy dispatcher may receive additional information beyond the concern-specific identifier and use the additional information in conjunction with the concern-specific identifier when responding to the privacy policy request. For example, the mobile application may enable the mobile device operator to configure a privacy level which indicates the permissions granted or disallowed by the mobile device operator, such as, but not limited to, permission to transmit a geolocation to a third-party system, permission to use a device-specific identifier, a prohibition against transmitting an item of personally-identifiable information or combinations thereof. In an example, a mobile device operator may configure a privacy policy level, such as "high", "medium" or "low", or some combination thereof. In an example, the rules configured by the mobile device operator may be sent with each privacy policy request, eliminating the requirement that the rules configured by the mobile device operator be stored at the third-party privacy compliance system in conjunction with a unique identifier for an individual instance of an installed mobile application, device or mobile device operator. The privacy policy dispatcher may select the privacy policy based, at least in part, on the additional information. Advantageously, the privacy of the mobile device operator may be preserved without requiring the registration or tracking of the individual instance of an installed mobile application, mobile device operator or mobile device by the third-party privacy compliance system 100.

In an example, a privacy policy dispatcher may receive an indication of the country in which the mobile device operator resides. For example, the implementation instructions may obtain this from a mobile device operating system. For example, a mobile device operating system may access this information from the user's locale preferences, the cellular data connection meta-information or another resource. The privacy policy dispatcher may use this additional information in conjunction with the concern-specific identifier when responding to the privacy policy request. For example, this can enable the third-party privacy compliance system to ensure that the privacy policy sent to a mobile device is consistent with local laws without transmitting precise geographic information to the third-party privacy compliance system 100.

Data collection module 104 can receive information from the mobile device 110. In an example, a mobile application 111 operating on a mobile device 110 sends information to the data collection module 104 using a method made available to the mobile application through the implementation instructions. The information may comprise a history related to the mobile device 110 or a mobile application 111. For example, the history can document a mobile device operator's interactions with the mobile device, the mobile application or both. The information may be sent in conjunction with the concern-specific identifier, enabling the aggregation of information across a community such as an installed base or installation cohort. When permitted by the properly enabled privacy policies, the information may be stored in conjunction with an identifier which is unique to a hardware device, individual instance of an installed mobile application or mobile device operator, enabling the collection of a history for a respective individual hardware device, individual instance of an installed mobile application or mobile device operator. When permitted by the properly enabled privacy policies, information received from the mobile device can be used to generate a fingerprint, enabling the collection of a history for a respective individual hardware device, individual instance of an installed mobile application or mobile device operator in conjunction with a unique, or nearly-unique fingerprint. In some cases, hashing an identifier or an item of information received from an individual hardware device can enable the collection of a coherent history for an individual hardware device, individual instance of an installed mobile application while making re-identification based on the identifier or item of information unrealistically difficult. While a unique identifier may be used in some cases in conjunction with the collection of a history, it is not required for the selection or implementation of a privacy policy.

In an embodiment, a mobile device operator may configure one or more rules which can be maintained at the mobile device and may not be transmitted to the third-party privacy compliant target system. In an example, the rules configured by the mobile device operator may be implemented in addition to other privacy policies, resulting in further restrictions on the information that may be sent from the mobile device to the third-party privacy compliant target system 100. In this way, the privacy of the mobile device operator can be customized and preserved without requiring the registration of an individual instance of an installed mobile application, mobile device operator or mobile device by the third-party privacy compliance system 100.

In an example, a mobile application concern or a third-party privacy compliance system 100 may configure a privacy policy to comply with the laws or regulations of a jurisdiction of importance such as the State of California, the United States or the European Union. In an embodiment, in order to prevent accidental non-compliance, rules configured by the mobile application concern, the third-party privacy compliance system or the third-party privacy compliant partner may not be made less restrictive by a rule configured by the mobile device operator.

In an embodiment, the instrumentation instructions may comprise instructions for prohibiting the transmission of information to a third-party privacy compliant target system via the instrumentation instructions in the event that the mobile device operator disables advertising tracking. In some cases, an individual instance of an installed mobile application may store a unique identifier such as application installation identifier on the mobile device. In some cases, the instrumentation instructions may provide instructions for detecting when a mobile device operator has disabled advertising tracking and may further initiate the generation of a new application installation identifier, for every mobile application on the mobile device which is integrated with the instrumentation instructions. Discarding a previously used application installation identifier and replacing it with a new application installation identifier, provides an obstacle to joining a previously collected history associated with the old installed application identifier with information related to the new application installation identifier.

Figure 2:
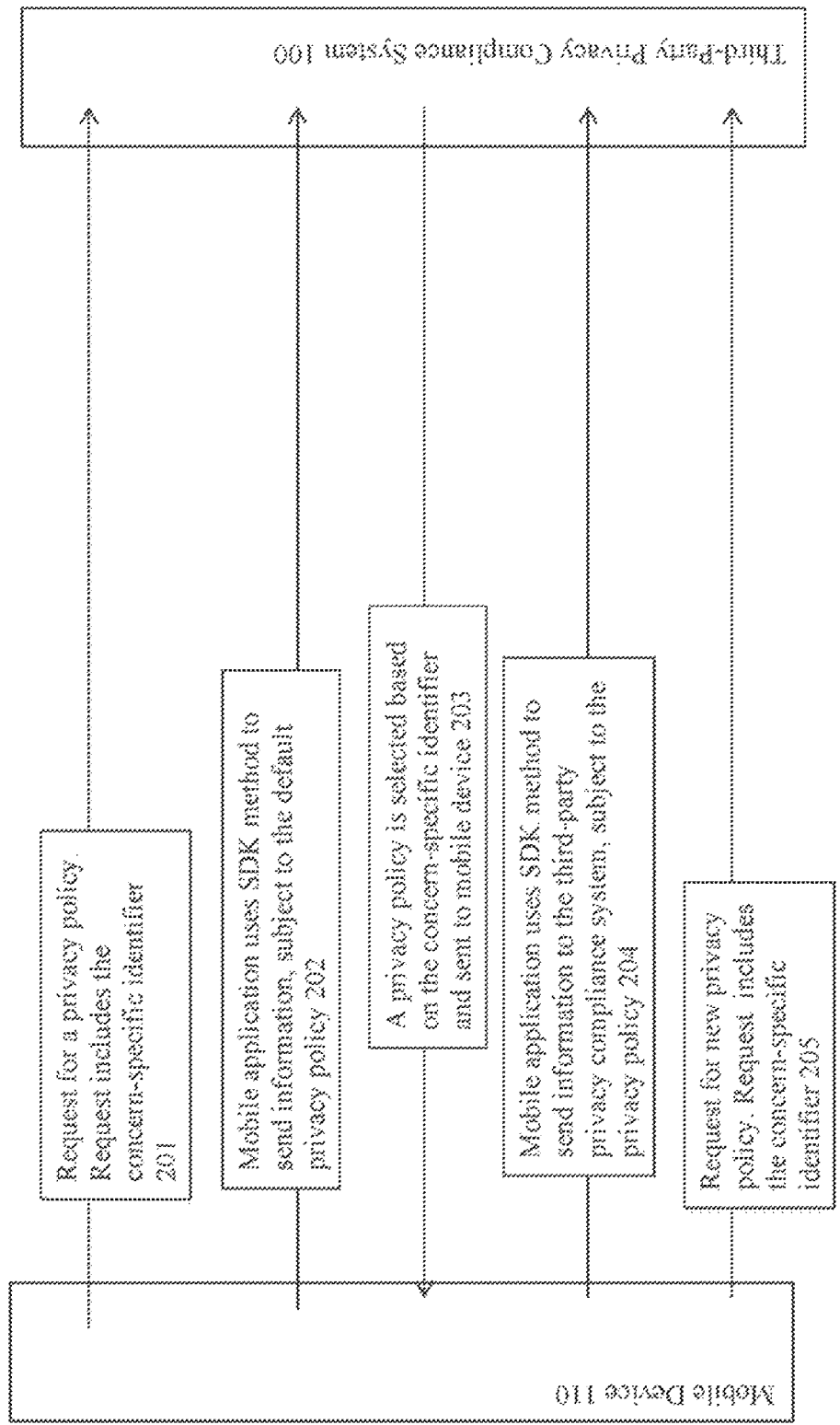
FIG. 2 illustrates an example of possible interactions between a mobile device and a third-party privacy compliance system, according to an embodiment.

FIG. 2 illustrates an example of possible interactions between a mobile device 110 and a third-party privacy compliance system 100, according to an embodiment. In this example, a mobile application 111 is installed on a mobile device 110. The mobile application has been integrated with implementation instructions in the form of a software developers kit (SDK), which include a concern-specific identifier 112. The SDK enables the mobile application to collect information about the mobile device 110 and the mobile application 111. Furthermore, the SDK includes methods for sending information to the third-party privacy compliance system 100. Additionally, the implementation instructions include a default privacy policy for use until a valid privacy policy is received. The integration instructions are configured so that a request for a privacy policy will be sent to the third-party privacy compliance system 100 each time the application is opened, each time the privacy policy expires (becomes invalid) at the end of each use session and each time the application is closed.

Referring to FIG. 2, the mobile application sends a request 201 for a privacy policy from the mobile to device 110 to the third-party privacy compliance system 100. The request includes a concern-specific identifier.

Before a privacy policy is received from the third-party privacy compliance system 100, the mobile application uses a method from the SDK to collect information available to the mobile application. The mobile application then uses a method from the SDK to send the information 202 to the third-party privacy compliance system 100, consistent with the default privacy policy. The information may be provided to data collection module 104 for processing, storage in the data repository 105, or both. For example, this limited information can be used to count the number of new installations in an installed base, according to the concern-specific identifier.

The third-party privacy compliance system 100 receives the privacy policy request 201 and selects a privacy policy based on the concern-specific identifier included in the request. The third-party privacy compliance system 100 sends the privacy policy from the third-party privacy compliance system 100 to the mobile to device 110 (203). In some cases, information received by the third-party privacy compliance system 100 as part of a privacy policy request may be provided to data collection module 104 for processing, storage in the data repository 105, or both, subject to the requirements of the selected privacy policy.

The mobile device 110 receives the privacy policy from the third-party privacy compliance system 100, and it is implemented through the implementation instructions. The mobile application uses an SDK method to send information to the third-party privacy compliance system 100, subject to the privacy policy (204).

The privacy policy becomes invalid at the end of a user-session, and a new privacy policy must be requested from the third-party privacy compliance system 100 (205).

Figure 3:
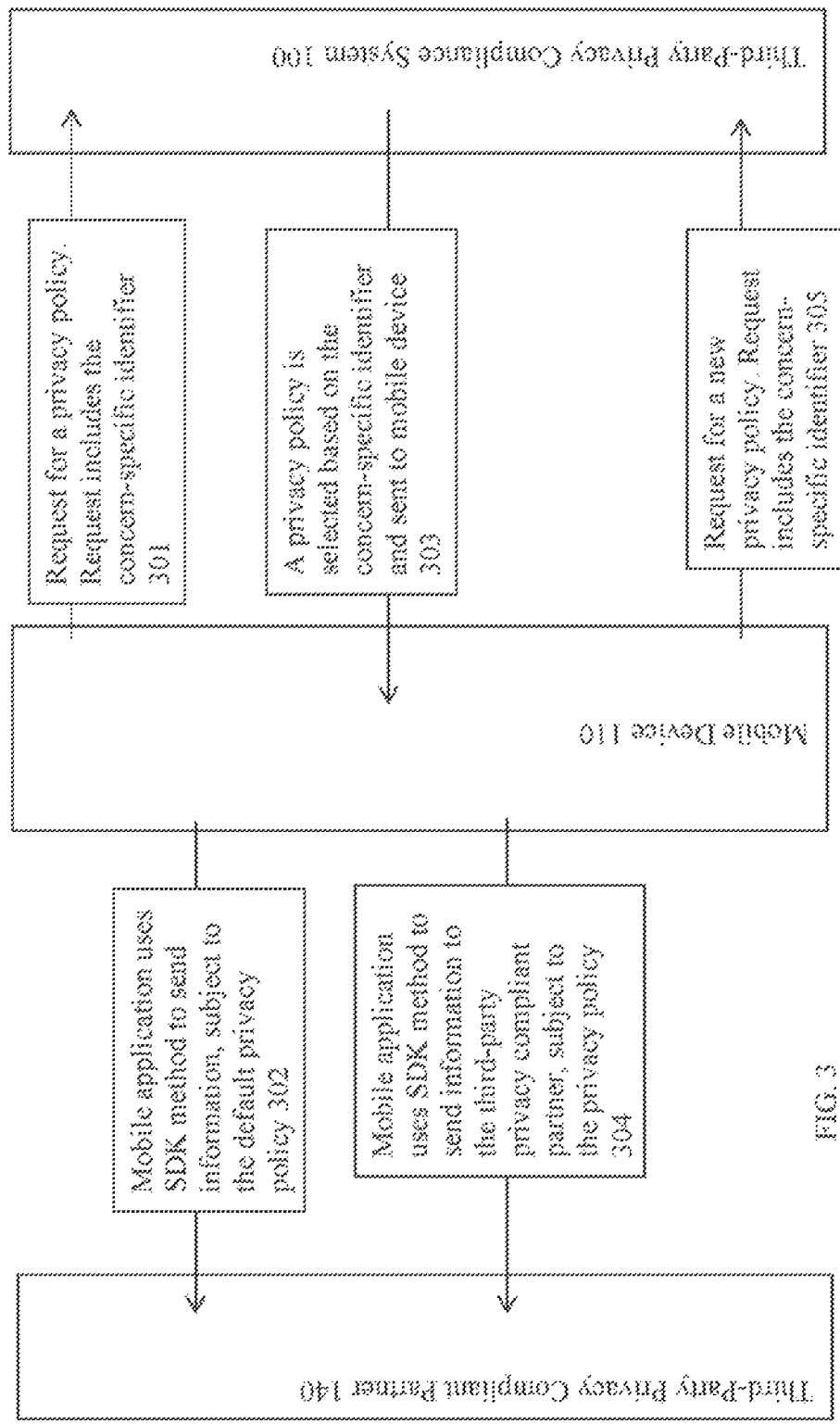
FIG. 3 illustrates an example of possible interactions between a mobile device, a third-party privacy compliance system and a third-party privacy compliant partner, according to an embodiment.

FIG. 3 illustrates an example of possible interactions between a mobile device 110, a third-party privacy compliance system 100 and a third-party privacy compliant partner 140, according to an embodiment. In this embodiment, the third-party privacy compliance system 100 enables the selective transmission of information from a mobile device 110 via a mobile application 111 to a third-party privacy compliant partner 140. In this case, an item of information may be collected at the mobile device and transmitted to the third-party privacy compliant partner 140. In some cases, the item of information may be transmitted to the third-party privacy compliance system 100; however, in some cases, the item of information may not be transmitted to the third-party privacy compliance system. The rules in a privacy policy may be customized with respect to each third-party privacy compliant target system, enabling the mobile application to limit the amount of information any single third-party entity receives. Advantageously, this can enable the mobile device to selectively share information with multiple third-party interests. Although one third-party privacy compliant partner 140 is illustrated in FIG. 1, the environment may include none, one or multiple third-party privacy compliant partners.

Referring to FIG. 3, a mobile application 111 is installed on a mobile device 110. The mobile application has been integrated with implementation instructions in the form of a software developers kit (SDK), which include a concern-specific identifier 112. The SDK third-party enables the mobile application to collect information about the mobile device 110 and the mobile application 111. Furthermore, the SDK includes methods for sending information to one or more the third-party privacy compliant target systems such as third-party privacy compliant partner 140. Additionally, the implementation instructions include a default privacy policy for use until a valid privacy policy is received. The integration instructions are configured so that a request for a privacy policy will be sent to the third-party privacy compliance system 100 each time the application is opened and each privacy policy expires (becomes invalid) at the end of each use session and each time the application is closed.

Referring to FIG. 3, the mobile application sends a request 301 for a privacy policy from the mobile to device 110 to the third-party privacy compliance system 100. The request includes the concern-specific identifier.

Before a privacy policy is received from the third-party privacy compliance system 100, the mobile application uses a method from the SDK to collect information about the mobile application. The mobile application then uses a method from the SDK to send the information 202 to the third-party privacy compliant partner 140, consistent with the default privacy policy. Advantageously, there is no requirement that the mobile device, mobile application or mobile device operator be registered with the third-party privacy compliant partner, nor is there a requirement for the mobile application to provide a unique identifier for uniquely identifying an individual instance of an installed mobile application, mobile device or mobile device operator.

The third-party privacy compliance system 100 receives the privacy policy request 301 and selects a privacy policy based on the concern-specific identifier included in the request. The third-party privacy compliance system 100 sends the privacy policy from the third-party privacy compliance system 100 to the mobile to device 110 (303). In some cases, information received by the third-party privacy compliance system 100 as part of a privacy policy request may be provided to data collection module 104 for processing, storage in the data repository 105, or both, if it is permitted according to the selected privacy policy.

The mobile device receives the privacy policy from the third-party privacy compliance system 100, and the privacy policy is implemented by the implementation instructions. The mobile Application uses an SDK method to send information to the third-party privacy compliant partner 140, subject to the privacy policy (304).

The privacy policy becomes invalid at the end of a user-session, and a new privacy policy must be requested from the third-party privacy compliance system 100 (305). In the example illustrated in FIG. 3, one third-party privacy compliant partner 140 with a single corresponding concern-specific identifier and a privacy policy is selected at the third-party privacy compliance system based on the concern-specific identifier. However, in other examples, there may be more than one third-party privacy compliant partner.

Figure 4:
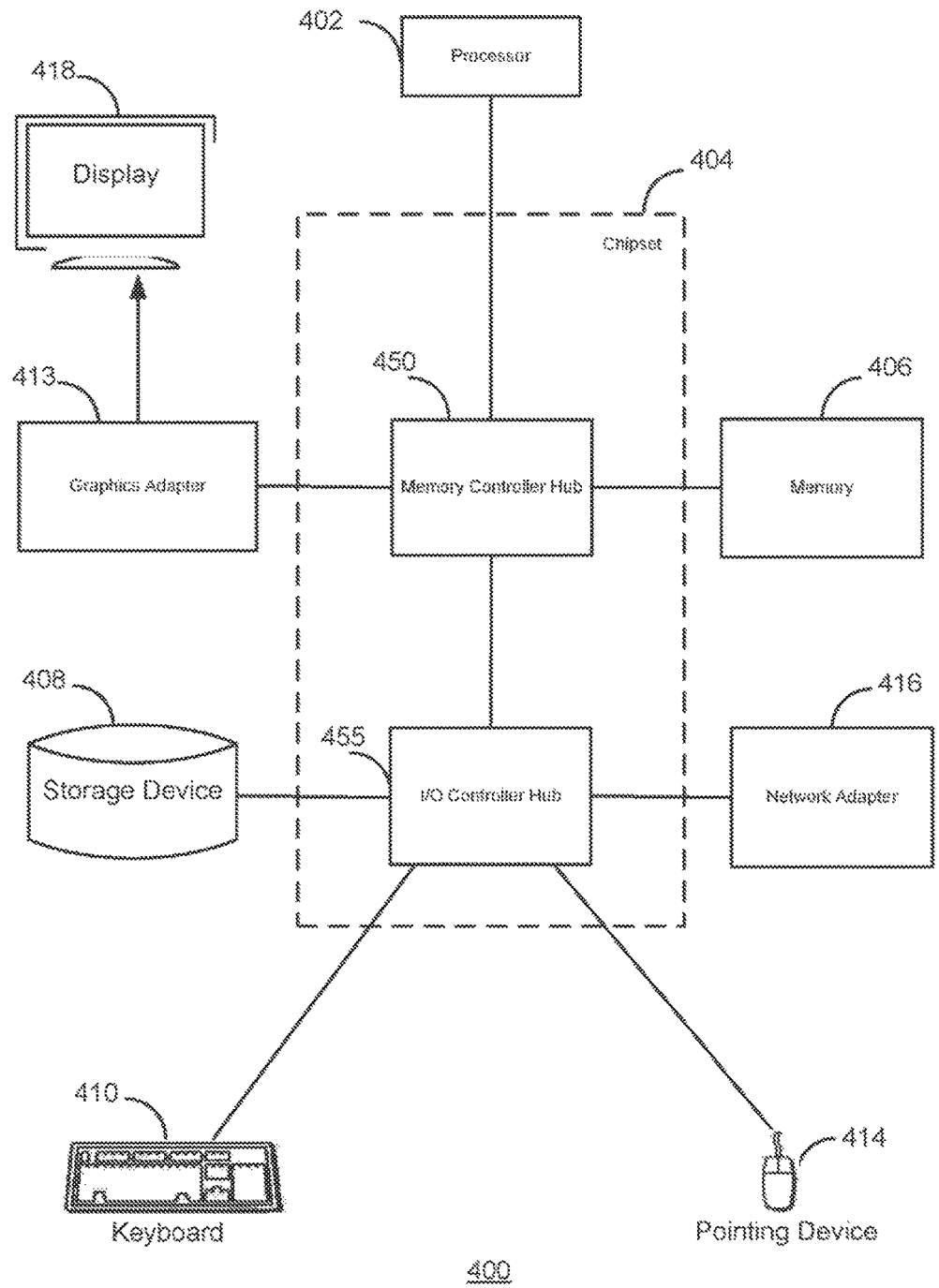
FIG. 4 is a high-level block diagram illustrating an example of a computer for use as a third-party privacy compliance system, mobile device, mobile application concern system, content provider and/or third-party privacy compliant partner of FIGS. 1, 2 and 3, in accordance with an embodiment of the invention.

FIG. 4 is a high-level block diagram illustrating an example of a computer 400 for use as a third-party privacy compliance system 100, mobile device 110, mobile application concern system 120, content provider 130 and/or third-party privacy compliant partner 140 of FIGS. 1, 2 and 3, in accordance with an embodiment of the invention. Illustrated are at least one processor 402 coupled to a chipset 404. The chipset 404 includes a memory controller hub 450 and an input/output (I/O) controller hub 455. A memory 406 and a graphics adapter 413 are coupled to the memory controller hub 450, and a display device 418 is coupled to the graphics adapter 413. A storage device 408, keyboard 410, pointing device 414, and network adapter 416 are coupled to the I/O controller hub 455. Other embodiments of the computer 400 have different architectures. For example, the memory 406 is directly coupled to the processor 402 in some embodiments.

The storage device 408 is a computer-readable storage medium such as a hard drive, compact disk read-only memory (CD-ROM), DVD, or a solid-state memory device. The memory 406 holds instructions and data used by the processor 402. The pointing device 414 is used in combination with the keyboard 410 to input data into the computer system 400. Mechanisms used to convey user input can include, but are not limited to, touchscreen interfaces, touchpads, directional pointing devices, voice controlled interfaces, hardware keyboard shortcuts, directional hardware keys and hardware elements such as wheels and rolling balls. The graphics adapter 413 displays images and other information on the display device 418. In some embodiments, the display device 418 includes a touch screen capability for receiving user input and selections. The network adapter 416 couples the computer system 400 to the communications network 101. Some embodiments of the computer 400 have different and/or other components than those shown in FIG. 4.

The computer 400 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 408, loaded into the memory 406, and executed by the processor 402.

The types of computers 400 used by the entities of FIGS. 1, 2 and 3 can vary depending upon the embodiment and the processing power used by the entity. For example, a mobile device 110 that is cell phone or PDA typically has limited processing power, a small display 418, and might lack a pointing device 414. The third-party privacy compliance system 100, in contrast, may comprise multiple blade servers working together to provide the functionality described herein.

FIG. 5 is a flow chart illustrating an example of a method 500 for selectively regulating transmission of information from a mobile device to a third-party privacy compliant target system, according to an embodiment. Referring to Step 510, a privacy policy is configured for each mobile application concern. A privacy policy can be mapped to an item of mobile application concern-specific information, such as a concern-specific identifier 112. This is a way of organizing a mobile application concern's installed base into one or more communities which will be consistently managed according to a common privacy policy. A privacy policy includes one or more rules for regulating transmission of information to a third-party privacy compliant target system, such as the third-party privacy compliance system 100 or a third-party privacy compliant partner 140. In some cases, a rule may only apply to a limited number of one or more third-party privacy compliant target systems; in this way, a mobile application concern can tune the privacy rules according to the intended destination of the information. In some cases, a rule may apply to all third-party privacy compliant target system, providing a global restriction applicable to all third-party privacy compliant target systems.

Referring to Step 520, instrumentation instructions for integration with a mobile application are provided. In some cases, the instrumentation instructions may be provided to a mobile application concern, which may integrate the instrumentation instructions with their application software for distribution to a mobile device. The instrumentation instructions are intended for execution on the mobile device. The instrumentation instructions may be provided in one format to a mobile application concern or software developer, such as a textual file format, but provided to the mobile device by the mobile application concern or software developer in another format, such as a compiled executable format.

Referring to Step 530, a privacy policy request is received at the third-party privacy compliance system. The privacy policy request includes an item of mobile application concern-specific information.

Referring to Step 540, a privacy policy is selected at the third-party privacy compliance system based on the item of mobile application concern-specific information.

Referring to Step 550, the selected privacy policy is sent to the mobile device for implementation.

FIG. 6 is a flow chart illustrating an example of a method 600 for selectively regulating transmission of information from a mobile device to a third-party privacy compliant target system, according to an embodiment. In this example, the method 600 is described from the perspective of the mobile device 110. Referring to Step 610, application software is installed on a mobile device 110. The application 111 is integrated with instrumentation instructions which direct the mobile device to request a privacy policy from a third-party privacy compliance system 100, with the request including a concern-specific identifier 112. In the absence of a valid privacy policy, all transmissions to the third-party privacy compliance system 100 as well as any third-party privacy compliant systems are subject to a restrictive default privacy policy which was included with the instrumentation instructions. The implementation instructions further include methods for sending information to third-party privacy compliant systems, subject to the privacy policy.

Referring to Step 620, a privacy policy request is sent from the mobile device to the third-party privacy compliance system 100. For example, the implementation instructions may be configured to direct the application to request a new privacy policy from the third-party privacy compliance system 100 the first time an application is operated, each time a new use session is initiated, according to a schedule, at regular intervals after a period of disuse, or combinations thereof. If a restrictive privacy policy is in force when the request is made, such as a restrictive default privacy policy, the amount of information provided in the request for a new privacy policy may be limited.

Referring to Step 630, a new privacy policy is received and implemented. The new privacy policy is implemented, and all information sent to third-party privacy compliant systems via the methods provided by the implementation instructions are subject to the new privacy policy for as long as the privacy policy is valid.

In an embodiment, a mobile device executes a suitable operating system, such as Android, Apple iOS, a Microsoft Windows-compatible operating system, Apple OS X, UNIX, and/or a Linux distribution. Some operating systems can detect or receive information from the mobile device hardware, mobile applications, mobile device firmware, systems integrated with the mobile device, input from the mobile device operator or combinations thereof. The method for selectively regulating transmission of information from a mobile device to a third-party privacy compliant target system, disclosed in the foregoing disclosure in terms of software comprising mobile application software is also applicable to software such as such as operating system software. In an embodiment, the operating system software concern, such as an operating system vendor or developer, may operate in the role of the previously described mobile application concern.

The order of the steps in the foregoing described methods of the invention are not intended to limit the invention; the steps may be rearranged.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A method comprising:
   providing instrumentation instructions for integration with a mobile application and operation by a mobile device, wherein the instrumentation instructions comprise instructions for:
   detecting, at the mobile device, an operator-configured privacy policy restriction configured by an operator of the mobile device;
   responsive to detecting an absence, at the mobile device, of a valid compliance system-configured privacy policy, requesting a privacy policy from a compliance system by the mobile device, the request comprising the operator-configured privacy policy restriction and a respective identifier of a software installation cohort representing a plurality of mobile devices including the mobile device;
   receiving the valid compliance system-configured privacy policy from the compliance system, the valid compliance system-configured privacy policy comprising a rule for regulating transmission of information from the mobile device to the partner system consistent with the operator-configured privacy policy restriction;
   selecting information in compliance with the received valid compliance system-configured privacy policy; and
   sending the selected information to the partner system;
   responsive to receiving the request at the compliance system from the mobile device, selecting the valid compliance system-configured privacy policy according to the identifier of the software installation cohort and the operator-configured privacy policy restriction of the request; and
   sending the selected valid compliance system-configured privacy policy to the mobile device.

2. The method of claim 1, wherein the instrumentation instructions further comprise instructions for:
   implementing a default privacy policy for regulating transmission of information to the partner system, at the mobile device, for use in the absence of a valid compliance system-configured privacy policy at the mobile device.

3. The method of claim 1, wherein the instrumentation instructions further comprise instructions for:
   invalidating the valid compliance system-configured privacy policy, after an end of a use session.

4. The method of claim 1, further comprising:
   responsive to selecting the valid compliance system-configured privacy policy,
   discarding, the operator-configured privacy policy restriction of the request.

5. The method of claim 4 wherein:
   the operator-configured privacy policy restriction of the request is discarded before the customized privacy policy is sent to the mobile device.

6. The method of claim 1 wherein the instrumentation instructions further comprise instructions for:
   responsive to receiving the valid compliance system-configured privacy policy, detecting information at the mobile device.

7. The method of claim 1 wherein the instrumentation instructions further comprise instructions for:
   transforming information at the mobile device according to the received valid compliance system-configured privacy policy; and wherein
   selecting information comprises selecting transformed information.

8. The method of claim 1 wherein the selected information comprises geolocation information.

9. A non-transitory computer readable storage medium executing computer program instructions, the computer program instructions comprising instructions for:
   providing instrumentation instructions for integration with a mobile application and operation by a mobile device, wherein the instrumentation instructions comprise instructions for:
   detecting, at the mobile device, an operator-configured privacy policy restriction configured by an operator of the mobile device;
   responsive to detecting an absence, at the mobile device, of a valid compliance system-configured privacy policy, requesting a privacy policy from a compliance system by the mobile device, the request comprising the operator-configured privacy policy restriction and a respective identifier of a software installation cohort representing a plurality of mobile devices including the mobile device;
   receiving the valid compliance system-configured privacy policy from the compliance system, the valid compliance system-configured privacy policy comprising a rule for regulating transmission of information from the mobile device to the partner system consistent with the operator-configured privacy policy restriction;

selecting information in compliance with the received valid compliance system-configured privacy policy; and sending the selected information to the partner system;

responsive to receiving the request from the mobile device, selecting the valid compliance system-configured privacy policy according to the identifier of the software installation cohort; and sending the selected valid compliance system-configured privacy policy to the mobile device.

10. The medium of claim 9, wherein the instrumentation instructions further comprise instructions for:

implementing a default privacy policy for regulating transmission of information to the partner system, at the mobile device, for use in the absence of a valid privacy policy at the mobile device.

11. The medium of claim 9, wherein the instrumentation instructions further comprise instructions for:

invalidating the privacy policy, after an end of a use session.

12. The medium of claim 9 wherein the instrumentation instructions further comprise instructions for:

responsive to receiving the valid compliance system-configured privacy policy, detecting information at the mobile device.

13. The medium of claim 9 wherein the instrumentation instructions further comprise instructions for:

transforming information at the mobile device according to the received valid compliance system-configured privacy policy; and wherein selecting information comprises selecting transformed information.

14. The medium of claim 9, wherein the selected information comprises geolocation information.

15. A system comprising:

a processor; and a non-transitory computer readable storage medium storing processor-executable computer program instructions, the instructions comprising instructions for:

providing instrumentation instructions for integration with a mobile application and operation by a mobile device, wherein the instrumentation instructions comprise instructions for detecting, at the mobile device, an operator-configured privacy policy restriction configured by an operator of the mobile device;

responsive to detecting an absence, at the mobile device, of a valid compliance system-configured privacy policy, requesting a privacy policy from a compliance system by the mobile device, the request comprising the operator-configured privacy policy restriction and a respective identifier of a software installation cohort representing a plurality of mobile devices including the mobile device;

receiving the valid compliance system-configured privacy policy from the compliance system, the valid compliance system-configured privacy policy comprising a rule for regulating transmission of information from the mobile device to the partner system consistent with the operator-configured privacy policy restriction;

selecting information in compliance with the received valid compliance system-configured privacy policy; and sending the selected information to the partner system;

responsive to receiving the request from the mobile device, selecting the valid compliance system-configured privacy policy according to the identifier of the software installation cohort; and sending the selected valid compliance system-configured privacy policy to the mobile device.

16. The system of claim 15, wherein the instrumentation instructions further comprise instructions for:

implementing a default privacy policy for regulating transmission of information to the partner system, at the mobile device, for use in the absence of a valid privacy policy at the mobile device.

17. The system of claim 15, wherein the instrumentation instructions further comprise instructions for:

implementing a default privacy policy for regulating transmission of information to the partner system, at the mobile device, for use in the absence of a valid privacy policy at the mobile device.

18. The system of claim 15, wherein the instrumentation instructions further comprise instructions for:

responsive to receiving the valid compliance system-configured privacy policy, detecting information at the mobile device.

19. The system of claim 15, wherein the instrumentation instructions further comprise instructions for:

transforming information at the mobile device according to the received valid compliance system-configured privacy policy; and wherein selecting information comprises selecting transformed information.

20. The system of claim 15, wherein the selected information comprises geolocation information.

* * * * *